United States Patent [19]

Fling

[11] Patent Number: 4,970,676
[45] Date of Patent: Nov. 13, 1990

[54] DIGITAL WORD-SERIAL MULTIPLIER CIRCUITRY

[75] Inventor: Russell T. Fling, Naperville, Ill.

[73] Assignee: RCA Licensing Corporation, Princeton, N.J.

[21] Appl. No.: 333,052

[22] Filed: Apr. 4, 1989

[51] Int. Cl.$^5$ ............................................. G06F 7/50
[52] U.S. Cl. .................................................. 364/759
[58] Field of Search ........................................ 364/759

[56] References Cited

U.S. PATENT DOCUMENTS

| | | | |
|---|---|---|---|
| 3,582,634 | 6/1971 | Bartlett | 364/759 |
| 3,761,699 | 9/1973 | Sather | 364/759 |
| 4,013,879 | 3/1977 | Bornmann et al. | 364/757 |
| 4,543,641 | 9/1985 | Fukuta et al. | 364/756 |
| 4,679,165 | 7/1987 | Rainer | 364/760 |
| 4,685,077 | 8/1987 | Loo | 364/759 |
| 4,878,191 | 10/1989 | Oguchi | 364/759 |

*Primary Examiner*—David M. Malzahn
*Attorney, Agent, or Firm*—Joseph S. Tripoli; Eric P. Herrmann; James B. Hayes

[57] ABSTRACT

A word serial multiplier includes a first circuit loop for loading a parallel-bit multiplier, and in response to a clock signal sequentially produces a gate signal corresponding to a sequence of bits of the multiplier sample in descending order of significance. A second circuit loop loads a multiplicand sample and in response to the clock signal successively divides the multiplicand sample by the factor two. The more significant bits, exclusive of the least significant bit, of the divided multiplicand sample are coupled to a gating circuit. The gating circuit passes the more significant bits to the input of an accumulator if the corresponding bits of the gate signal exhibit a predetermined state. After a number of cycles of the clock signal, corresponding to the number of bits m of the multiplier sample, the accumulator produces a scaled product equal to the muliplicand times the multiplier times the scale factor of $2^{-(m-1)}$.

6 Claims, 4 Drawing Sheets

DIGITAL WORD-SERIAL MULTIPLIER CIRCUITRY

This invention is related to circuitry for producing the scaled product of two binary numbers.

BACKGROUND OF THE INVENTION

Frequently in digital signal processing systems it is necessary to multiply a whole number by a fractional number. The precision of the product will be no better than the precision of the whole number. The bit width of the product and thus the bit width of the multiplier circuit will be equal to the sum of the number of bits in the multiplier and the multiplicand. However, in general, the product need not be expressed with any more bits than the number of bits in the multiplicand plus one.

For convenience in assembling processing hardware fractional numbers are frequently converted to floating point format to reduce the number of connections required. In this instance calculations are performed using nonfractional numbers with the results ultimately being properly justified and truncated to the requisite precision. An example of this type of circuitry may be found in digital television receiver circuitry for adjusting the hue or color. In this circuitry signal magnitudes representing color difference signals are multiplied by correction factors in the form of sines and cosines to produce appropriate color vectors. The fractional values representing the sines and cosines are typically provided by memory circuits programmed to provide the sines and cosines multiplied by $2^R$ where R is equal to the number of bits that would be used to represent a fractional sine or cosine. The multiplied sines and cosines are thus provided as whole numbers which are then utilized in the correction circuitry. Note however, that if a fraction of X-bit precision is placed in floating point form to multiply a whole number of X bit precision, the product will be a 2X bit number before proper justification and truncation. Thus, regardless of whether or not an X-bit fraction is placed in floating point format for multiplying an X-bit whole number typical multiplier circuits provide 2X-bit products.

It is an object of this invention to provide a multiplier for multiplying a whole number by a floating point fraction which requires minimum circuitry and produces a properly justified and truncated product of precision equal to that of the whole number.

In addition it is frequently desired to generate the product of a first number times an X-bit second number, which product is scaled by $2^{-(X-1)}$. It is a further object of the invention to provide a simple multiplier to provide this compound function.

SUMMARY OF THE INVENTION

The present invention is a word-serial multiplier including a first loop responsive to a load pulse for loading a parallel-bit multiplier sample and responsive to a system clock, for producing, as control pulses, the bits of the multiplier sample in a sequence from most significant bit first to least significant bit last.

A second loop responsive to the load pulse loads a parallel-bit multiplicand sample and responsive to the system clock provides a sequence of parallel-bit subsamples, each subsample corresponding to the multiplicand sample successively divided by two.

A gating circuit coupled to the first and second loops, and responsive to the control pulses, passes subsamples that occur concurrently with a control pulse. Subsamples which are passed by the gating circuit are coupled to a third circuit loop including an accumulator for summing the subsamples. The accumulator is reset to zero responsive to the load pulses and provides a product after a predetermined number of the clock pulses.

DETAILED DESCRIPTION

The basic structure of the present invention is a one quadrant multiplier for generating scaled products of pulse code modulated (PCM) samples (e.g., binary samples). The particular quadrant chosen for discussion is the quadrant wherein multiplier and multiplicand are both positive. Other quadrants may be chosen with minor modifications to the circuitry to be described.

Figure 1:
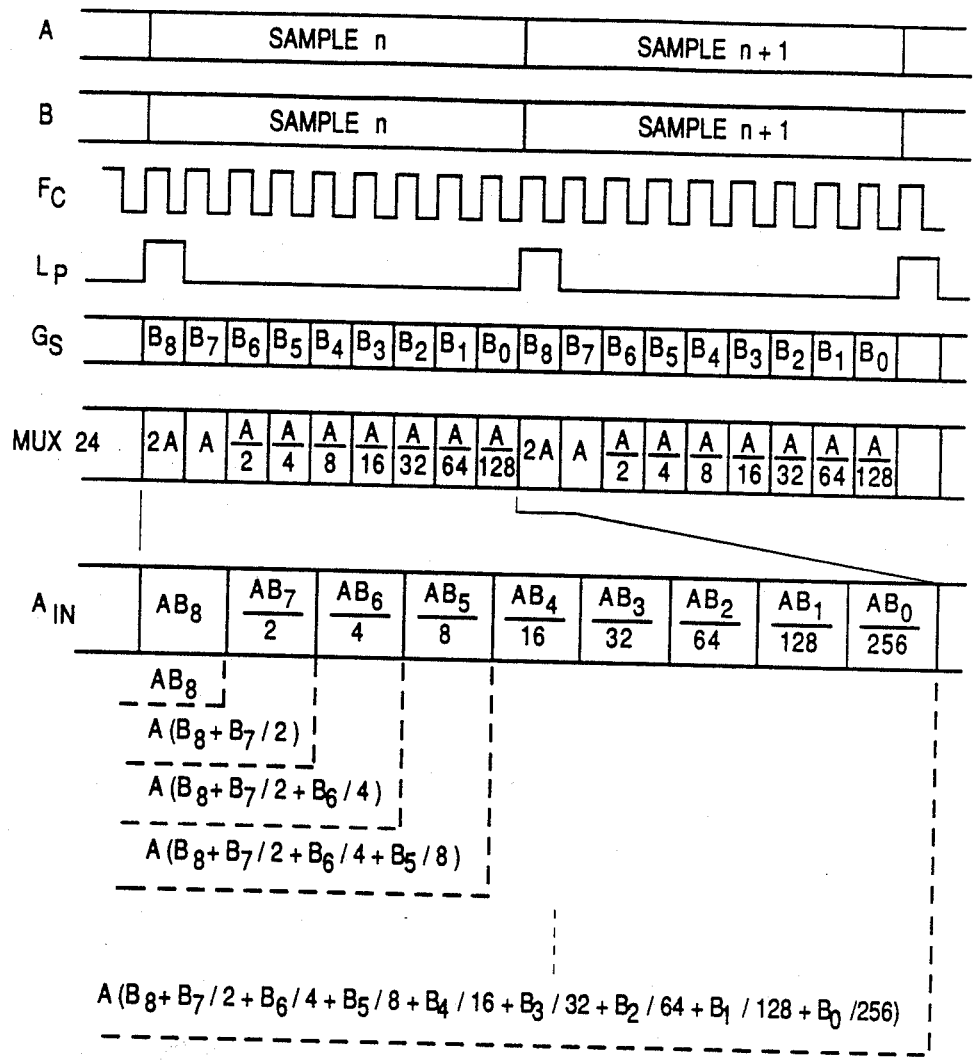
FIG. 1 is a waveform diagram of selected sample and clock waveforms useful in describing the invention.

The system is a word-serial system, which in the context of this disclosure means that the PCM samples to be multiplied (multiplicand and multiplier) occur as parallel-bit samples at a predetermined rate $F_s$ but the processing of each sample is performed iteratively according to, e.g., the number of bits in a multiplier sample. In FIG. 1 the sample rate is equal to the frequency of the signal $L_p$. The periods of the multiplicand samples A are indicated by the timing blocks "A" and the period of the multiplier samples are indicated by the timing blocks "B".

A system clock Fc is shown in FIG. 1, which clock is utilized to implement the iterative processing. The exemplary waveform of the system clock Fc is shown having nine periods per sample period. This constrains the bit width of the multiplier samples to be nine or less. Alternatively, if the multiplier samples have N bits, the system clock must have at least N cycles per sample period.

Figure 2:
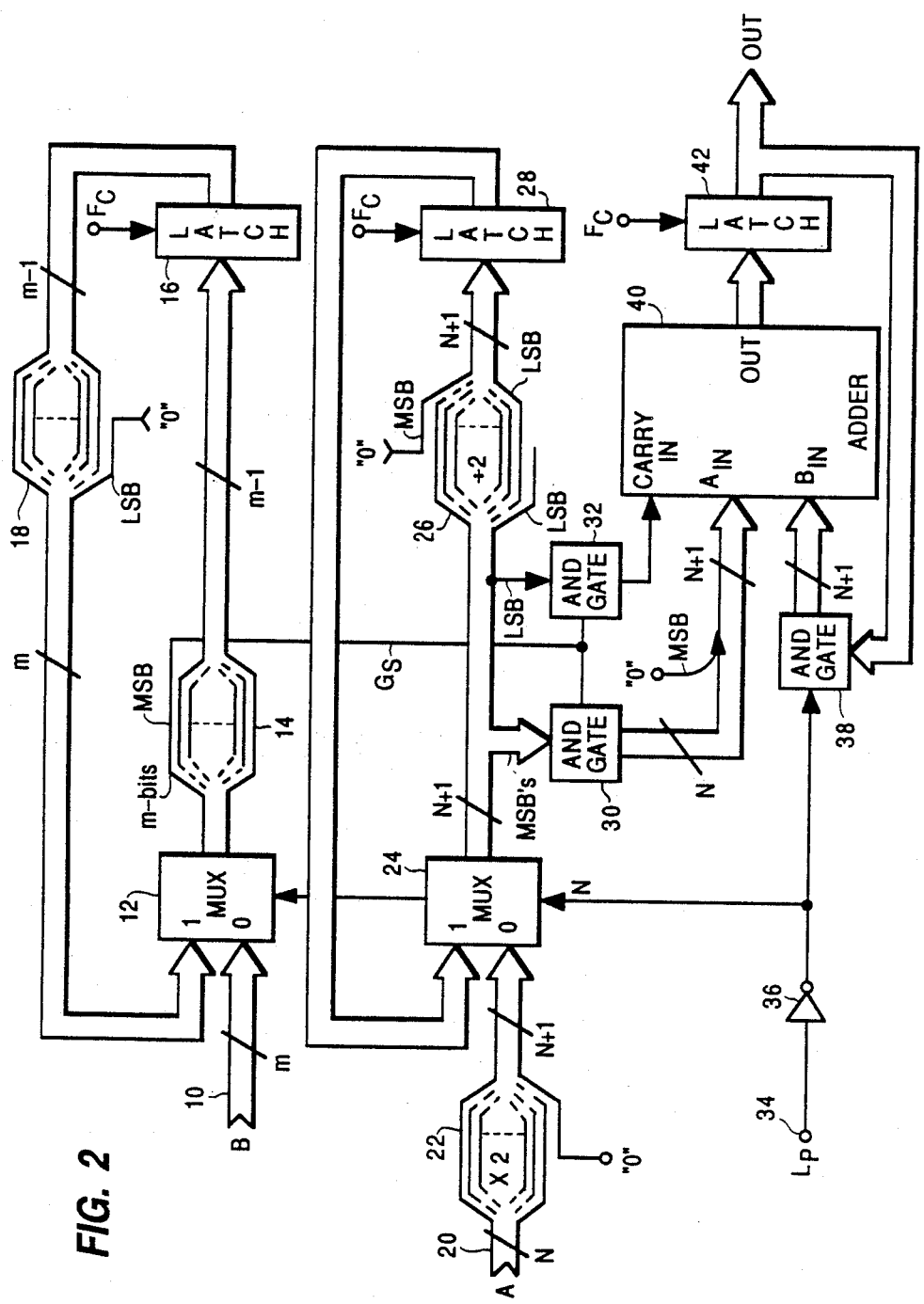
FIG. 2 is a bock diagram of exemplary multiplier circuitry embodying the invention.

Refer now to FIG. 2. In the FIGURE broad arrows indicate parallel connection busses. A diagonal slash through a bus with a number adjacent the slash indicates the number of connections in the bus.

Multiplier samples, B, are applied from a source (not shown) to an input connection 10. Multiplicand samples, A, are applied from a further source (not shown) to an input connection 20. The multiplicand samples are coupled to a circuit element 22 wherein they are multiplied by the factor 2. In this discussion it is assumed that both multiplier and multiplicand samples are in binary format. In binary format multiplication of samples by the factor two is accomplished by shifting the respective bits of the sample to one position of greater bit significance and inserting a zero at the least significant bit (LSB) position. In FIG. 2 element 22 is a hard wired bit shift of one bit position of greater significance.

The multiplier samples B are coupled to one input port of a multiplexer 12 and the two-times multiplicand samples (2A) are coupled to one input port of a further multiplexer 24. When the load pulse signal Lp is high the samples 2A and B are loaded into respective system processing loops by the multiplexers 24 and 12.

One loop comprises the multiplexer 12, latch 16 and elements 14 and 18. Element 14 is merely a wiring connection which eliminates the most significant bit connection from the bus connecting the output of the multiplexer to the input of the latch 16. The most significant bit connection is utilized as a gate control signal Gs and coupled to control the AND circuits 30 and 32. Element 18 is a wiring arrangement which shifts all the bits of a sample to one bit position of greater bit significance by adding an LSB position having a zero value.

When the load pulse is low, element 14, latch 16 and element 18 are configured in a closed loop by the multiplexer 12. The sample B loaded into this loop is circulated around the loop by the latch 16 which is clocked by the system clock Fc. Latch 16 may be a D-type latch with the circulated samples B coupled to its "Data" input and the system clock signal coupled to its "clock" input. During each period of the system clock, Fc, the sample B is circulated around the loop, and a lesser significant bit is moved to the MSB position. Assume that the bits of a sample B, arranged from MSB to LSB, are designated $B_8, B_7, B_6, \ldots B_1, B_0$. When the sample is first loaded into the loop, bit $B_8$ is in the MSB position and applied as the gate signal Gs, to the AND circuits 30 and 32. During the next subsequent period of the clock signal Fc, bit $B_7$ is in the MSB position and applied as signal Gs. The row of symbols designated Gs in FIG. 1 illustrates the sequence of sample bits which are coupled to control the AND circuits during respective clock periods.

The second loop comprises multiplexer 24, circuit element 26 and latch 28. Latch 28 may be a D-type latch clocked by the system clock Fc. Element 26 is a wiring arrangement which shifts all bits of the sample 2A to one bit position of lesser significance. This bit shift performs a divide by two function. Element 26 may be arranged to either precede or follow the latch 28. If element 26 is located after latch 28, latch 28 need be only an N-bit latch rather than an N+1-bit latch.

The multiplicand samples are circulated around the second loop under the control of the system clock Fc. Each time the sample is circulated it is divided by the factor two. For each period of the clock Fc, occurring during a sample period, the respective sample value provided by the multiplexer 24 is illustrated in FIG. 1 in the row labeled MUX 24.

Assuming the sample 2A has N+1 bits, the N MSB's of the sample provided by the multiplexer 24 are coupled to the AND circuit 30, and the LSB is coupled to the AND circuit 32. The AND circuits 30 and 32 pass the bit values coupled to their respective input connections when the gate signal Gs exhibits a predetermined logic state, e.g., logic one value, and provide zero values when the gate signal Gs exhibits a logic state opposite the predetermined state. The output connection of the AND circuit 30 is coupled to a first input port of an adder circuit 40. The output connection of the AND circuit 32 is coupled to the carry-in input terminal of the adder 40. The output port of the adder is coupled to the input port of the clocked latch 42, the output port of which is coupled to the input port of an AND circuit 38. The output port of the AND circuit 38 is coupled to a second input port of the adder 40. The adder 40, latch 42 and AND circuit 38 form a typical accumulator circuit. The AND circuit 38 is conditioned by the signal Lp to open the accumulator feedback loop and thereby reinitialize the accumulator each time a new sample is loaded into the system (during the Lp pulses) and to close the loop for subsequent periods of the system clock.

The N MSB's of the samples from multiplexer 24 are coupled to the N LSB positions of the input port of the adder 40. This connection performs a further division by two. The sample values coupled to the A input port of the adder for each clock period are shown in the row of values of FIG. 1 labeled AIN. Note each of these values is a product of a fractional A sample times a bit value (one or zero) of the B sample. The sequential output values provided by the adder circuit 40 are shown in part beneath the row AIN. The output values provided by the accumulator, i.e., latch 42 are the same as the output values provided by the adder but occur one period of the system clock Fc later. The lastmost sum illustrated in FIG. 1 corresponds to the value of the product provided by the multiplier. If each bit of the sample B is a logic one. The output sample is equal to A times (1+255/256) or 511/256. Typically, however, if the multiplier samples are positive valued and in two's complement form, the MSB ($B_8$) will be zero valued. In this instance the range of output values is from A times 255/256 to A times zero. Each of these output sample values is less than the original sample value A and thus can be represented by the same number of bits as the multiplicand sample A. Therefore, the adder 40, latch 42 and AND circuit 38 need have a bit capacity no greater than that of the multiplicand. In the FIGURE these elements are provided with an extra bit to accommodate a non-zero MSB of the sample B and to provide overhead to preclude foldover in the event of noise corrupting the process.

A particular feature of the FIG. 2 circuitry is the application of the LSB of the multiplicand to the carry input of the accumulator adder. AND gate 30 provides a divided by 2 and truncated partial product to the adder 40. The LSB provided by AND gate 32 represents the remainder of the division, which when added as a carry input provides a rounding function. The addition of the LSB by the carry-in prevents truncation errors. The accumulater result is always as close to the proper result as the precision of the number of bits can provide.

Referring to the lastmost product in FIG. 1 it is seen that the number of bits in the multiplier sample B is 9 but the product is divided by $2^8$. Therefore, if the multiplier sample has m-bits the system of FIG. 2 performs the function $AB/2^{m-1}$.

Note further that if the multiplier sample B has fewer than 9 bits, the affect on rows Gs and AIN in FIG. 1 would be a substitution of zero for lesser significant bit positions. For example, if the samples B are five bits wide, each box in Gs and AIN having bits $B_3, B_2, B_1$ and $B_0$ would become zero valued. The output product will equal $AB/2^4 = AB/16$. It does not matter that the number of bits in the samples B are less than the number of system clock periods per sample. The only restriction is that the number of system clock periods per sample be at least as large as the number of bits defining the multiplier samples. The number of bits in the multiplicand samples are of no consequence in determining the system clock signal.

Figure 3:
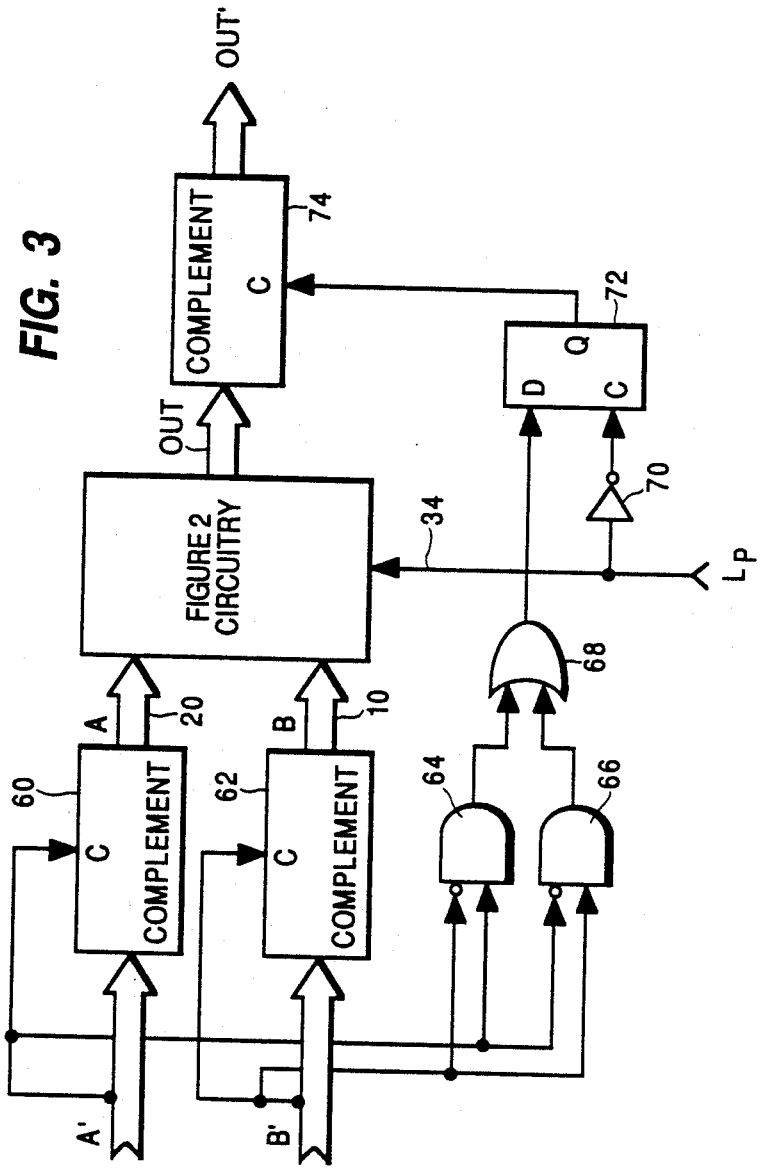
FIG. 3 is a block diagram of a further embodiment of the invention.

FIG. 3 adapts the circuitry of FIG. 2 for multiplying numbers of different polarities. This is accomplished by circuitry which (a) insures that only positive valued samples are coupled to the FIG. 2 multiplier circuit and (b) keeps track of the original polarities of the input samples so that output samples from the multiplier can be assigned the appropriate polarity. In FIG. 3 samples of a multiplicand input signal A' are applied to a complementing circuit 60. The sign bit of the input samples are also coupled to a control input terminal C of the complementing circuit. Responsive to sign bits of the input samples, the complementing circuit 60 inverts the polarity of negative samples and passes unaltered positive samples to the input port 20 of the FIG. 2 circuitry. Similarly, a multiplier input signal B' is applied to a complementing circuit 62 which provides samples B of single polarity to input connection 10.

The sign bits of the signal samples A' and B' are coupled to logic circuitry including AND gates 64 and 66 and OR gate 68. This logic circuitry, at the output of OR gate 68, produces a polarity control signal having a logic one state whenever the samples A' and B' are of opposite polarity and a logic zero state otherwise. The polarity control signal is loaded into a latch 72 at the negative going transition of the load pulse. Latch 72 stores the control signal for a period equal to a sample period and which extends over the interval where the multiplier output signal is valid. The stored polarity control signal is applied to the control input terminal of a further complementing circuit 74. Complementing circuit 74 is arranged to pass output products from the FIG. 2 circuitry unaltered when the polarity control signal exhibits a logic zero state and to complement output products when the polarity control signal exhibits a logic one state.

Figure 4:
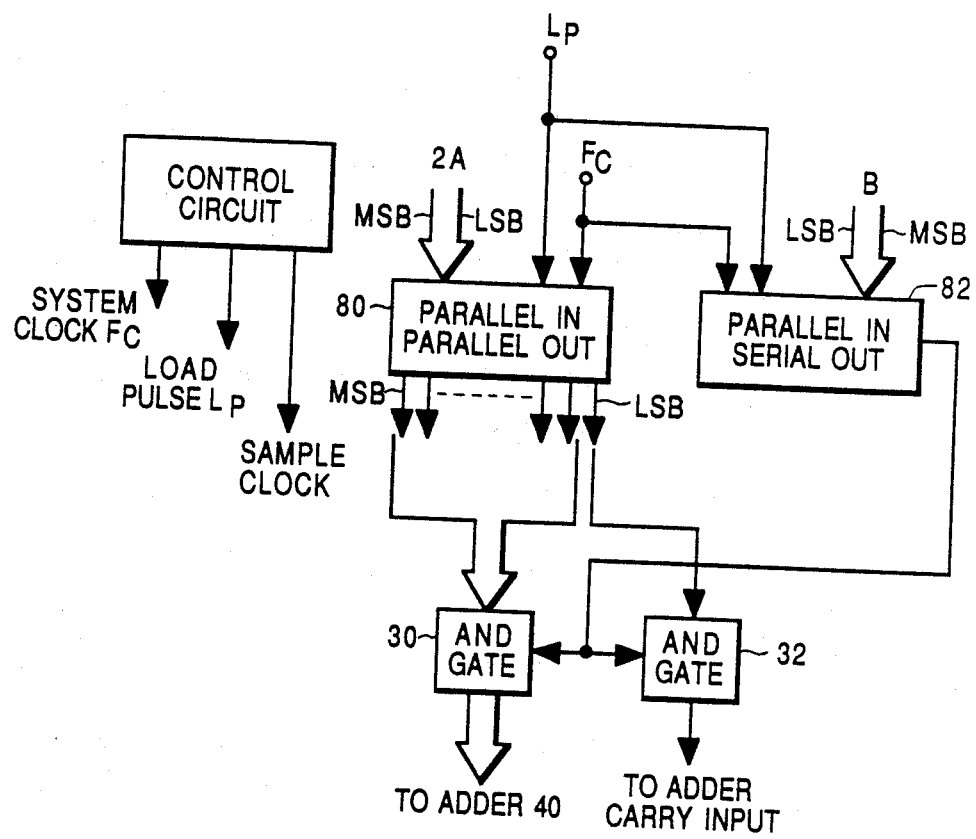
FIG. 4 is a partial diagram of an alternative embodiment of a multiplier circuit.

FIG. 4 is an alternative arrangement for a portion of the FIG. 2 circuitry. In FIG. 4 the first loop for processing the multiplier samples B is replaced by a parallel-input-serial output shift register 82. The parallel-bit samples B are loaded into the register 82 responsive to the load pulse signal Lp. The bits of samples B are arranged sequentially in the register 82 with the most significant bit nearest the serial output connection. The bits are sequentially shifted to the output terminal responsive to the system clock Fc. The serial output terminal of the register 82 is coupled to the control terminals of the gating circuits 30 and 32.

The second loop for processing the samples 2A is replaced by a parallel-input-parallel-output shift register 80. The bits of the samples 2A are loaded in parallel into register 80 responsive to the load pulses Lp.

The parallel output connection corresponding to the LSB is coupled to the input terminal of the gating circuit 32. The remaining parallel output connections corresponding to the more significant bits are coupled to the input terminal of the gating circuit 30. Register 80, responsive to the system clock Fc sequentially shifts the bits loaded in register 80 to one position of lesser bit significance each period of the clock Fc. The most significant bit position that is vacated by the shifting operation is conditioned to exhibit a logic zero. Operated in this manner, the shift register 80 performs a divide-by-two function each system clock cycle.

The output connections from gating circuits 30 and 32 are coupled to circuitry similar to that illustrated in FIG. 2.

Note that the circuitry of FIG. 4 is conceptually simpler than that illustrated in FIG. 2, however the FIG. 2 circuitry is preferred because it is more parts efficient and more readily realizable in integrated form.

I claim:

1. Circuitry for generating products of parallel-bit PCM samples A and B, said samples A and B respectively having bits of ascending significance including a LSB and a MSB, said circuitry comprising:

respective terminals for receiving said PCM samples A and B, a load pulse signal and a system clock signal Fc;

first means responsive to said load pulse signal, a sample B, and said system clock signal Fc, for providing a gate signal corresponding to a sequence of bits of said sample B in descending order of significance from MSB first to LSB last;

second means responsive to said load pulse signal, a sample A, and said system clock signal Fc for providing a sequence of samples corresponding to said sample A successively divided by increasing powers of two;

third means coupled to said second means, and responsive to said gate signal exhibiting a predetermined state for passing the LSB of samples of said sequence corresponding to said sample A successively divided by increasing powers of two;

fourth means, coupled to said second means and responsive to said gate signal exhibiting said predetermined state, for passing the more significant bits exclusive of said LSB of samples of said sequence corresponding to said sample A successively divided by increasing powers of two;

adder circuitry, having a first input terminal coupled to said fourth means with said more significant bits coupled to lesser significant bit positions of said first input terminal, having a carry input terminal coupled to receive said LSB passed by said third means, having a second input terminal and an output terminal;

means including a clocked latch coupled between the output and second input terminals of said adder circuitry for conditioning said adder circuitry to operate as an accumulator.

2. The circuitry set forth in claim 1 wherein said samples B consists of m bits and said accumulator provides scaled output products equal to $AB/2^{m-1}$ where A and B represent the values of samples A and B respectively.

3. The circuitry set forth in claim 1 wherein said first means comprises:

a multiplexer having a first input terminal for receiving said sample B, having a second input terminal and an output terminal;

a further clocked latch, having input and output terminals, and responsive to said system clock signal Fc for storing a sample applied to its input terminal;

fifth means having input and output connections, for receiving a parallel bit sample and shifting each of the sample bits to one position of greater significance; and means for serially connecting said further clocked latch and said fifth means between the output and second input terminals of said multiplexer, and wherein said gate signal is accessed from the MSB of said output terminal of said multiplexer.

4. The circuitry set forth in claim 1 wherein said second means comprises:

means, coupled to receive said sample A, for multiplying said sample A by the factor 2;

a multiplexer having a first input terminal coupled to receive said sample A multiplied by two, having a second input terminal and an output terminal;

a further clocked latch having respective input and output terminals and responsive to said system clock signal for storing samples applied to its input terminal;

fifth means, having respective input and output connections, for dividing samples applied to its input connection by the factor two;

means for serially coupling said further clocked latch and said fifth means between the output terminal of said multiplexer and the second input terminal of said multiplexer, and wherein said third and fourth means are coupled to the output terminal of said multiplexer.

5. The circuitry set forth in claim 4 wherein said first means comprises:

a further multiplexer having a first input terminal for receiving said sample B, having a second input terminal and an output terminal;

a second further clocked latch having input and output terminals, and responsive to said system clock Fc, for storing a sample applied to its input terminal;

sixth means, having input and output connections, for receiving a parallel bit sample and shifting each of the sample bits to one position of greater significance; and means for serially connecting said second further clocked latch and said sixth means between the output and second input terminals of said further multiplexer, and wherein said gate signal is accessed from the MSB of said output terminal of said further multiplexer.

6. Circuitry for generating products of parallel-bit PCM samples A and B, said samples A and B respectively having bits of ascending significance including a LSB and a MSB, said circuitry comprising:

respective terminals for receiving said PCM samples A and B, a load pulse signal and a system clock signal Fc;

first means responsive to said load pulse signal a sample B, and said system clock signal Fc, for providing a gate signal corresponding to a sequence of bits of said sample B in descending order of significance from MSB first to LSB last;

second means responsive to said load pulse signal, a sample A, and said system clock signal, for providing a sequence of samples corresponding to said sample A successively divided by increasing powers of two;

third means, coupled to said second means and responsive to said gate signal exhibiting a predetermined state, for passing the more significant bits, exclusive of the LSB, of samples of said sequence corresponding to said sample A successively divided by increasing powers of two;

adder circuitry, having a first input terminal coupled to said third means with said more significant bits coupled to lesser significant bit positions of said first input terminal, having a second input terminal and an output terminal; and means for coupling the output terminal of said adder circuitry to its second input terminal to configure said adder circuitry to operate as a gated accumulator, the output of which provides product values proportional to AB where A and B are amplitude values of samples A and B.

* * * * *